(12) United States Patent
Clemente

(10) Patent No.: US 10,194,192 B2
(45) Date of Patent: *Jan. 29, 2019

(54) INTEGRATED INTERNET CAMERA SYSTEM AND METHOD

(71) Applicant: ALEX IS THE BEST, LLC, Brooklyn, NY (US)

(72) Inventor: Frank Clemente, Brooklyn, NY (US)

(73) Assignee: ALEX IS THE BEST, LLC, Staten Island, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/715,170

(22) Filed: Sep. 26, 2017

(65) Prior Publication Data

US 2018/0027275 A1    Jan. 25, 2018

Related U.S. Application Data

(63) Continuation of application No. 15/295,940, filed on Oct. 17, 2016, now Pat. No. 9,774,901, which is a
(Continued)

(51) Int. Cl.
*H04N 5/225* (2006.01)
*H04N 21/4223* (2011.01)
(Continued)

(52) U.S. Cl.
CPC ..... *H04N 21/4223* (2013.01); *H04N 1/00204* (2013.01); *H04N 1/00217* (2013.01);
(Continued)

(58) Field of Classification Search
CPC ........... H04N 1/00204; H04N 1/00217; H04N 1/00244; H04N 1/00347; H04N 5/44;
(Continued)

(56) References Cited

U.S. PATENT DOCUMENTS 5,027,150 A    6/1991   Inoue et al.
5,825,413 A   10/1998   Mullis
(Continued)

FOREIGN PATENT DOCUMENTS

EP      1 062 800 B1    4/2003
WO   1995/035627 A1   12/1995
(Continued)

OTHER PUBLICATIONS

Narayanaswami et al., "Expanding the Digital Camera's Reach," J. Computer, Dec. 2004, pp. 65-73, vol. 37, issue 12, IEEE Computer Society Press, Los Alamitos, CA, USA.
(Continued)

*Primary Examiner* — Nnenna N Ekpo
(74) *Attorney, Agent, or Firm* — Im IP Law; C. Andrew Im; Chai Im

(57) ABSTRACT

An Internet direct device comprises an imaging system to capture at least one of audio, still images and video images, and a microprocessor. The microprocessor transmits at least one of the captured audio, the captured still images and the captured video images to a website archive and review center and/or another Internet direct device upon image capture over a communications network. The Internet direct device automatically connects to the communications network on power-up using one of a plurality of available modes of connection, which is designated as a primary mode of connection. The Internet direct device automatically switches to another available mode of connection when the communications network is unavailable.

14 Claims, 2 Drawing Sheets

Related U.S. Application Data continuation of application No. 14/948,486, filed on Nov. 23, 2015, now Pat. No. 9,473,750, which is a continuation of application No. 14/578,403, filed on Dec. 20, 2014, now Pat. No. 9,197,806, which is a continuation of application No. 14/053,600, filed on Oct. 15, 2013, now Pat. No. 8,947,542, which is a continuation of application No. 13/925,498, filed on Jun. 24, 2013, now Pat. No. 8,581,991, which is a continuation of application No. 13/415,346, filed on Mar. 8, 2012, now Pat. No. 8,477,197, which is a continuation of application No. 13/037,303, filed on Feb. 28, 2011, now Pat. No. 8,134,600, which is a continuation of application No. 12/637,277, filed on Dec. 14, 2009, now Pat. No. 7,907,172, which is a continuation of application No. 11/484,373, filed on Jul. 11, 2006, now Pat. No. 7,633,524.

(60) Provisional application No. 60/702,470, filed on Jul. 26, 2005.

(51) Int. Cl.

| | | |
|---|---|---|
| *H04N 21/437* | (2011.01) | |
| *H04N 21/41* | (2011.01) | |
| *H04N 21/45* | (2011.01) | |
| *H04N 1/00* | (2006.01) | |
| *H04N 5/232* | (2006.01) | |
| *H04N 21/61* | (2011.01) | |
| *H04N 7/18* | (2006.01) | |
| *H04N 5/46* | (2006.01) | |
| *H04N 21/218* | (2011.01) | |
| *H04N 21/2187* | (2011.01) | |
| *H04N 21/231* | (2011.01) | |
| *H04N 21/258* | (2011.01) | |
| *H04N 21/4627* | (2011.01) | |
| *H04N 5/44* | (2011.01) | |
| *H04N 5/76* | (2006.01) | |
| *H04N 21/222* | (2011.01) | |
| *H04L 29/06* | (2006.01) | |

(52) U.S. Cl.
CPC ..... *H04N 1/00244* (2013.01); *H04N 1/00347* (2013.01); *H04N 5/23206* (2013.01); *H04N 5/44* (2013.01); *H04N 5/46* (2013.01); *H04N 5/76* (2013.01); *H04N 7/18* (2013.01); *H04N 7/183* (2013.01); *H04N 21/2181* (2013.01); *H04N 21/2187* (2013.01); *H04N 21/2223* (2013.01); *H04N 21/23109* (2013.01); *H04N 21/25875* (2013.01); *H04N 21/41* (2013.01); *H04N 21/437* (2013.01); *H04N 21/4508* (2013.01); *H04N 21/4524* (2013.01); *H04N 21/4627* (2013.01); *H04N 21/6125* (2013.01); *H04N 21/6175* (2013.01); *H04L 69/14* (2013.01); *H04N 2201/0015* (2013.01); *H04N 2201/0039* (2013.01); *H04N 2201/0084* (2013.01)

(58) Field of Classification Search
CPC .. H04N 5/46; H04N 5/76; H04N 7/18; H04N 7/183; H04N 21/2181; H04N 21/2187; H04N 21/2223; H04N 21/23109; H04N 21/25875; H04N 21/41; H04N 21/4508; H04N 21/4524; H04N 21/4627; H04N 21/6125; H04N 21/6175
USPC ........................................................ 725/116
See application file for complete search history.

(56) References Cited

U.S. PATENT DOCUMENTS

| | | | |
|---|---|---|---|
| 5,994,699 A | 11/1999 | Akagawa | |
| 6,239,833 B1 | 5/2001 | Ozaki et al. | |
| 6,567,122 B1 | 5/2003 | Anderson et al. | |
| 6,636,259 B1 | 10/2003 | Anderson et al. | |
| 6,658,091 B1 | 12/2003 | Naidoo et al. | |
| 6,744,467 B2 | 6/2004 | Thompson et al. | |
| 6,763,226 B1 | 7/2004 | McZeal, Jr. | |
| 6,882,326 B2 | 4/2005 | Hirayama et al. | |
| 6,930,709 B1* | 8/2005 | Creamer | H04N 1/00214 348/207.1 |
| 6,980,232 B2* | 12/2005 | Suzuki | H04N 1/00204 348/207.1 |
| 7,272,641 B2* | 9/2007 | Yamagishi | H04N 1/00209 709/218 |
| 7,333,785 B1 | 2/2008 | Lavelle et al. | |
| 7,395,056 B2* | 7/2008 | Petermann | H04W 84/14 455/422.1 |
| 2001/0005840 A1* | 6/2001 | Verkama | G06Q 20/102 705/67 |
| 2001/0017655 A1 | 8/2001 | Arakt | |
| 2001/0024232 A1 | 9/2001 | Suzuki | |
| 2002/0013815 A1 | 1/2002 | Obradovich et al. | |
| 2002/0053087 A1 | 5/2002 | Negishi et al. | |
| 2002/0143769 A1 | 10/2002 | Tecu et al. | |
| 2002/0150228 A1 | 10/2002 | Umeda et al. | |
| 2002/0164945 A1 | 11/2002 | Olsen et al. | |
| 2003/0020811 A1 | 1/2003 | Hunter et al. | |
| 2003/0227540 A1 | 12/2003 | Monroe | |
| 2004/0070670 A1 | 4/2004 | Foster | |
| 2004/0105008 A1 | 6/2004 | Yamazaki | |
| 2004/0109063 A1* | 6/2004 | Kusaka | H04N 1/00477 348/207.1 |
| 2004/0109066 A1 | 6/2004 | Inoue et al. | |
| 2004/0127208 A1 | 7/2004 | Nair et al. | |
| 2004/0133668 A1 | 7/2004 | Nicholas, III | |
| 2004/0152440 A1 | 8/2004 | Yoda et al. | |
| 2004/0169759 A1 | 9/2004 | Kikuchi | |
| 2004/0250288 A1* | 12/2004 | Palmerio | G08B 13/19645 725/105 |
| 2005/0014493 A1 | 1/2005 | Ford | |
| 2005/0055727 A1 | 3/2005 | Creamer et al. | |
| 2005/0057649 A1 | 3/2005 | Marks | |
| 2005/0078189 A1 | 4/2005 | Creamer et al. | |
| 2005/0096034 A1* | 5/2005 | Petermann | H04W 16/26 455/422.1 |
| 2005/0099519 A1 | 5/2005 | Creamer et al. | |
| 2005/0102167 A1 | 5/2005 | Kapoor | |
| 2005/0130611 A1 | 6/2005 | Lu et al. | |
| 2005/0144653 A1 | 6/2005 | Creamer et al. | |
| 2005/0146609 A1 | 7/2005 | Creamer et al. | |
| 2005/0146610 A1 | 7/2005 | Creamer et al. | |
| 2005/0146621 A1 | 7/2005 | Tanaka et al. | |
| 2005/0149979 A1 | 7/2005 | Creamer et al. | |
| 2005/0213147 A1 | 9/2005 | Minatogawa | |
| 2006/0008256 A1 | 1/2006 | Khedouri et al. | |
| 2006/0143684 A1 | 6/2006 | Morris | |
| 2006/0150211 A1* | 7/2006 | Ritter | H04N 7/1675 725/31 |
| 2006/0161960 A1 | 7/2006 | Benoit | |
| 2006/0290326 A1* | 12/2006 | Bhesania | G05F 1/70 323/210 |

FOREIGN PATENT DOCUMENTS

| | | |
|---|---|---|
| WO | 2001/027787 A1 | 4/2001 |
| WO | 2004/015951 A1 | 2/2004 |

OTHER PUBLICATIONS

Petition for Inter Parte Review of U.S. Pat. No. 8,947,542, IPR2017-02055, Sep. 7, 2017.
PTAB Decision Instituting Inter Parte Review of U.S. Pat. No. 8,947,542, IPR2017-02055, Mar. 9, 2018.

(56) References Cited

OTHER PUBLICATIONS

Patent Owner Request for Adverse Judgment Under 37 CFR 42.73(B)(2) of U.S. Pat. No. 8,947,542, IPR2017-02055, Jun. 5, 2018.
PTAB Judgment Granting Request for Adverse Judgment Under 37 CFR 42.73(B) of U.S. Pat. No. 8,947,542, IPR2017-02055, Jul. 26, 2018.
Petition for Inter Parte Review of U.S. Pat. No. 8,134,600, IPR2017-02056, Sep. 7, 2017.
PTAB Decision Instituting Inter Parte Review of U.S. Pat. No. 8,134,600, IPR2017-02056, Mar. 9, 2018.
Patent Owner Request for Adverse Judgment Under 37 CFR 42.73(B)(2) of U.S. Pat. No. 8,134,600, PR2017-02056, Jun. 5, 2018.
PTAB Judgment Granting Request for Adverse Judgment Under 37 CFR 42.73(B) of U.S. Pat. No. 8,134,600, IPR2017-02056, Jul. 26, 2018.
Petition for Inter Parte Review of U.S. Pat. No. 8,581,991, IPR2017-02059, Sep. 7, 2017.
PTAB Decision Instituting Inter Parte Review of U.S. Pat. No. 8,581,991, IPR2017-02059, Mar. 9, 2018.
Patent Owner Request for Adverse Judgment Under 37 CFR 42.73(B)(2) of U.S. Pat. No. 8,581,991, PR2017-02059, Jun. 5, 2018.
PTAB Judgment Granting Request for Adverse Judgment Under 37 CFR 42.73(B) of U.S. Pat. No. 8,581,991, IPR2017-02059, Jul. 26, 2018.
Petition for Inter Parte Review of U.S. Pat. No. 7,907,172, IPR2017-02052, Sep. 7, 2017.
PTAB Decision Denying Inter Parte Review of U.S. Pat. No. 7,907,172, IPR2017-02052, Mar. 26, 2018.
Patent Owner Preliminary Response to Petition for Inter Parte Review of U.S. Pat. No. 7,907,172, IPR2017-02052, Jan. 9, 2018.
Petition for Inter Parte Review of U.S. Pat. No. 8,477,197, IPR2017-02053, Sep. 7, 2017.
Patent Owner Preliminary Response to Petition for Inter Parte Review of U.S. Pat. No. 8,477,197, IPR2017-02053, Jan. 9, 2018.
PTAB Decision Denying Inter Parte Review of U.S. Pat. No. 8,477,197, IPR2017-02053, Mar. 26, 2018.
Petition for Inter Parte Review of U.S. Pat. No. 7,633,524, IPR2017-02054, Sep. 7, 2017.
Patent Owner Preliminary Response to Petition for Inter Parte Review of U.S. Pat. No. 7,633,524, IPR2017-02054, Jan. 5, 2018.
PTAB Decision Denying Inter Parte Review of U.S. Pat. No. 7,633,524, IPR2017-02054, Mar. 28, 2018.
Petition for Inter Parte Review of U.S. Pat. No. 9,197,806, IPR2017-02057, Sep. 7, 2017.
Patent Owner Preliminary Response to Petition for Inter Parte Review of U.S. Pat. No. 9,197,806, IPR2017-02057, Jan. 9, 2018.
PTAB Decision Denying Inter Parte Review of U.S. Pat. No. 9,197,806, IPR2017-02057, Mar. 28, 2018.
Petition for Inter Parte Review of U.S. Pat. No. 8,581,991, IPR2017-02058, Sep. 7, 2017.
Patent Owner Preliminary Response to Petition for Inter Parte Review of U.S. Pat. No. 8,581,991, IPR2017-02058, Dec. 14, 2017.
PTAB Decision Denying Inter Parte Review of U.S. Pat. No. 8,581,991, IPR2017-02058, Mar. 9, 2018.
Patent Owner Preliminary Response to Petition for Inter Parte Review of U.S. Pat. No. 8,947,542, IPR2017-02055, Dec. 14, 2017.
Patent Owner Preliminary Response to Petition for Inter Parte Review of U.S. Pat. No. 8,134,600, IPR2017-02056, Dec. 14, 2017.
Patent Owner Preliminary Response to Petition for Inter Parte Review of U.S. Pat. No. 8,581,991, IPR2017-02059, Dec. 14, 2017.

* cited by examiner

INTEGRATED INTERNET CAMERA SYSTEM AND METHOD

RELATED APPLICATION

The present application is a continuation of application Ser. No. 15/295,940 filed Oct. 17, 2016, which is a continuation of application Ser. No. 14/948,486 filed Nov. 23, 2015, now U.S. Pat. No. 9,473,750, which is a continuation of application Ser. No. 14/578,403 filed Dec. 20, 2014, now U.S. Pat. No. 9,197,806, which is a continuation of application Ser. No. 14/053,600 filed Oct. 15, 2013, now U.S. Pat. No. 8,947,542, which is continuation-in-part of application Ser. No. 13/925,498 filed Jun. 24, 2013, now U.S. Pat. No. 8,581,991, which is a continuation of application Ser. No. 13/415,346 filed Mar. 8, 2012, now U.S. Pat. No. 8,477,197, which is a continuation of application Ser. No. 13/037,303 filed Feb. 28, 2011, now U.S. Pat. No. 8,134,600, which is a continuation of application Ser. No. 12/637,277 filed Dec. 14, 2009, now U.S. Pat. No. 7,907,172, which is a continuation of application Ser. No. 11/484,373 filed Jul. 11, 2006, now U.S. Pat. No. 7,633,524, which claims a priority to U.S. Provisional Patent Application Ser. No. 60/702,470, each of which is incorporated herein by reference in its entirety.

FIELD OF THE INVENTION

The present invention relates to an integrated Internet camera and/or system that is simple to install, operate and maintain, more particularly to an integrated Internet camera and/or video system that seamlessly and automatically transmits, receives, stores and/or archives still images, video and/or audio to and from a web site service/monitor center over the Internet using one or more integrated Internet cameras.

BACKGROUND OF THE INVENTION

The increasing use and awareness of the utility afforded by the Internet has transformed this simple image recording or capture process into a more complicated process requiring permanent storage and providing a secure centralized access to such storage from any remote location.

The currently available camera systems available are rigid and expensive. These systems are complex and require a host of peripheral devices to place an image on the Internet or Web. Additionally, these systems are bulky and not very portable. Moreover, the user must install one or more software to operate such camera systems. In a security monitoring application, these camera systems require a qualified operator to operate and maintain such system.

An example of such prior camera system is shown in FIG. 1. In order for an operator to transfer the still image, video and/or audio file from a video camera 100 to an account on the Internet or Web, the operator must connect the video camera 100 to a personal computer PC 200. The still image, video and/or audio file is transferred and stored in the PC 200 before it is transferred or uploaded onto the Internet. That is, the camera 100 must be connected to a network device (e.g., PC 200) before it can transmit or receive still image, video or audio files.

Some have attempted to resolve this problem by purchasing a network card (wired or wireless) to enable their camera 100 to connect to the Internet without a separate network device (i.e., PC 200). However, such solution is only available if the camera 100 can accept such network card and does not provide two-way access to the image file, i.e., transmitting to storage and receiving from storage. Additionally, such solution generally requires the operator to install the network card and accompanying software to "network" enabled camera 100.

Therefore, it is desirable to have an integrated Internet camera system that can seamlessly upload and download video and/or audio files to and from the Internet, transmits these files to another web-enabled portable device (e.g., another camera, a personal digital assistant (PDA), a cell phone and the like), receive/download video and/or audio files from another portable device and/or store/archive these files in a secure website without the necessity of connecting to another device, such as a PC 200.

OBJECTS AND SUMMARY OF THE INVENTION

There are many commercial and general consumer needs for this integrated Internet camera system. Some examples are in the fields of security, engineering, entertainment, advertising, child care monitoring and personal use, such as for family social occasions.

Accordingly, it is an object of the present invention to provide an integrated Internet camera system ("IICS") that allows even the novice users to seamlessly link their Internet direct cameras ("IDC") to a dedicated website of the IICS operator (such as a website archive and review center ("WSARC") to begin recording/storing/archiving of the images on the WSARC by simply powering their IDC. The present invention's ease of use, less working parts, lower maintenances, lower expenses, and easily accessible support enables the novice users to quickly employ and enjoy the IICS of the present invention. Additionally, the IICS is very flexible, it can be easily expanded and customized to provide a host of services and meet various needs of both personal and commercial users.

It is another object of the present invention to provide the IICS as aforesaid, which comprises IDC that can automatically and seamlessly connect to the WSARC by simply powering on the IDC. That is, when an operator takes a picture, the IDC automatically transmits the image to the WSARC.

Accordingly, it is an object of the present invention to provide an inexpensive and efficient camera having all necessary functionality for transmission and reception of real-time, stored and archived digital images to and from the Internet in a single, portable standalone apparatus (i.e., an embedded system), without requiring the use of an external controlling apparatus such as a personal computer.

Another object of the present invention is to provide a WSARC that enables an authorized user to schedule transmission of digital images to one or more IDC(s) upon receipt of an image from an IDC associated with that authorized user.

A further object of the present invention is to provide a portable, standalone camera that initiates transmission of digital images to the Internet, i.e., WSARC, upon an image capture.

In accordance with an exemplary embodiment of the present invention, an integrated Internet camera system for transmitting digital images to an Internet address comprises an image pickup, an optical module for forming an image on the image pickup, and an image capturing module for capturing digital images from the image pickup. A wireless device or SIM card connects and maintains the IDC's connection to the Internet for transmission of the digital image files to a user account associated with the IDC at a predetermined Internet address (i.e., WSARC) and transfers the digital image files to the user account. The digital image files in the user account are then available to authorized users of the account. Depending on the access privilege such authorized user may access the entire or a portion of the stored/archived digital image files.

In accordance with an exemplary embodiment of the present invention, an integrated Internet camera system comprises a website archive and review center (WSARC) for storing, archiving and managing images and an Internet direct camera (IDC) for capturing an image, automatically transmitting the image to an account associated with the IDC on the WSARC upon image capture and receiving stored/archived image from the WSARC. The IDC comprises a display for displaying the captured image and the received image. The IDC automatically connects to the WSARC over an Internet connection on power-up.

In accordance with an exemplary embodiment of the present invention, an Internet direct device comprises an imaging system to capture audio or video images and a microprocessor. The microprocessor transmits the captured audio or video images to another Internet direct device upon image capture and receives audio or video images from the other Internet direct device over a communications network. The Internet direct device automatically connects to the communications network on power-up using one of a plurality of available modes of connection, which is designated as a primary mode of connection. The Internet direct device automatically switches to another available mode of connection when the Internet direct device detects that the primary mode of connection to the communications network is unavailable.

In accordance with an exemplary embodiment of the present invention, the Internet direct device further comprises a storage device for locally storing captured audio or video images and the received audio or video images.

In accordance with an exemplary embodiment of the present invention, the aforesaid Internet direct device is a tablet or a Smartphone with a camera comprising an optical or digital zoom lens to provide magnification for use as a binocular or microscope. The microprocessor controls the magnification of the optical or digital zooms lens.

In accordance with an exemplary embodiment of the present invention, the Internet direct device further comprises a GPS to determine a current location of the Internet direct device. The Internet direct device communicates with a satellite to obtain live satellite image of its current location.

In accordance with an exemplary embodiment of the present invention, the Internet direct device further comprises a touch keypad to receive an input comprising a location and zooming instructions from a user. The Internet direct device communicates with a satellite to obtain live satellite image of the location entered on the touch keypad and to adjust a magnification of the satellite image based on the zooming instructions.

In accordance with an exemplary embodiment of the present invention, the Internet direct device further comprises a white or colored LED to operate as a white or colored strobe light.

In accordance with an exemplary embodiment of the present invention, the Internet direct device further comprises a LCD display and a touch keypad to receive an input comprising magnification instructions from a user. The controls the LCD display to provide a magnified mirror and adjusts a magnification of the mirror based the magnification instructions.

In accordance with an exemplary embodiment of the present invention, the aforesaid microprocessor transmits the captured audio or video images to an account associated with the Internet direct device on a website upon image capture.

In accordance with an exemplary embodiment of the present invention, a method for transmitting and receiving audio or video images by an Internet direct device associated with a user over a communications network comprises the step of automatically connecting the Internet direct device to the communications network on power-up using one of a plurality of available modes of connection, which is designated as a primary mode of connection. An image capture system of the Internet direct device captures audio or video images. A microprocessor the Internet direct device transmits the captured audio or video images to another Internet direct device over the communications network upon image capture and receives audio or video images from the other Internet direct device over the communications network. The microprocessor automatically switches to another available mode of connection when the Internet direct device detects that the primary mode of connection to the communications network is unavailable.

In accordance with an exemplary embodiment of the present invention, a non-transitory storage medium comprises a program for transmitting and receiving audio or video images over a communications network. The program when executed by an Internet direct device associated with a user to cause the Internet direct device to automatically connect the Internet direct device to the communications network on power-up using one of a plurality of available modes of connection, which is designated as a primary mode of connection. The program causes the Internet direct device to capture audio or video images by an image capture system of the Internet direct device. The program causes the Internet direct device to transmit the captured audio or video images to another Internet direct device over the communications network upon image capture by a microprocessor of the Internet direct device, and receive audio or video images from the other Internet direct device over the communications network by the Internet direct device. the program causes the Internet direct device to automatically switch to another available mode of connection by the microprocessor when the Internet direct device detects that the primary mode of connection to the communications network is unavailable.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein.

DETAILED DESCRIPTION OF THE EMBODIMENTS

Figure 1:
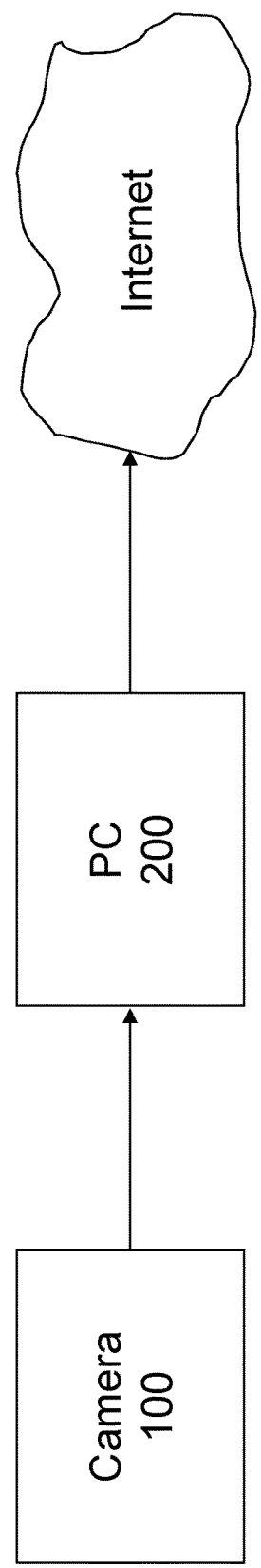
FIG. 1 shows a conventional stationary camera which captures and transmits images to the Internet using a local PC.
Figure 2:
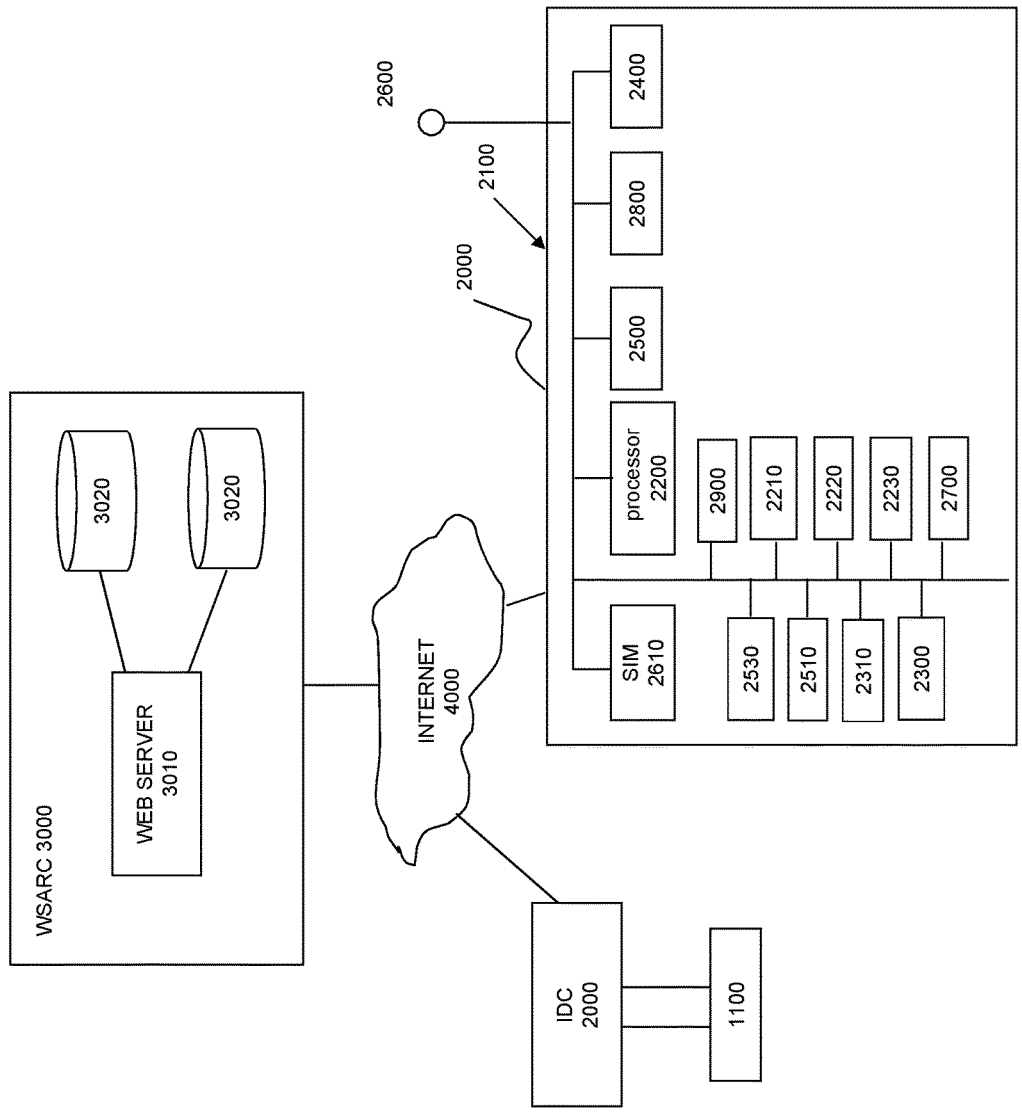
FIG. 2 illustrates an Integrated Internet camera system in accordance with an exemplary embodiment of the present invention.

Turning now to FIG. 2, there is illustrated an integrated Internet camera system (IICS) 1000 in accordance with an embodiment of the present invention comprising a plurality Internet direct cameras (IDCs) 2000 connected to a website archive and storage center (WSARC) 3000 over the Internet 4000. The WSARC 3000 comprises a web server 3010 and one or more database 3020 to store and/or archive images received from the IDCs 2000. The IICS 1000 uses the IDC 2000 (preferably a multi-mode, web-enabled portable device with a camera/video) to transmit a still image, video and audio (collectively referred to herein as the "data"), onto the Internet 4000 via a multi mode Internet Access Antenna (IAA) 2600 to a monitored WSARC 3000. The IDC 2000 can connect to the Internet via, but not limited to, land line, DSL, cable, satellite, wireless network, cellular, Wi-Fi, Wi-Max and the like. Preferably, the IDC 2000 connects to the Internet via a primary mode of communication and switches over the secondary mode of communication if the IDC 2000 detects a failure in the primary mode of communication. For example, if the IDC 2000 is programmed or setup to use Wi-Fi as a primary mode of communication, the IDC 2000 can switch to a cellular communication if the Wi-Fi communication is lost or unavailable.

In accordance with an exemplary embodiment of the present invention, the IDC 2000 comprises an embedded address, a subscriber identification module (SIM) card 2610 or other comparable device or means to enable the IDC's connection to the WSARC 3000 to be embedded, preset, encrypted, proprietary and firewall protected. If the IDC 2000 is faulty or inoperable, the user can simply remove its SIM card 2610 and install it in the new IDC 2000. That is, the SIM card 2610 is interchangeable from one IDC 2000 to another IDC 2000.

In accordance with an exemplary embodiment of the present invention, the IDC 2000 comprises a microcontroller or microprocessor 2200 for controlling the various components of the IDC 2000, a display 2300, preferably LCD display, to display captured images, an image-forming optical system 2500 for capturing images, a compression module 2210 for compressing captured images, a storage device 2400 for storing and/or archiving capture images, an image adjusting module 2220 for performing image processing on a stored/archived digital image and a text module 2230 for superimposing text information on a stored/archived digital image. In accordance with an embodiment of the present invention, the microcontroller 2200 controls the compression module 2210 to perform image compression, e.g., JPEG, Huffman, wavelet and the like and outputs images in JPEG, TIFF, GIFF and other known formats for storage in the storage device 2400 and/or transmission to the WSARC 3000. The microcontroller 2200 also can control the image adjusting module 2220 to adjust the resolution of image stored/archived in the storage device 2400 on a continuous scale with preferred preservation of aspect ratio either before or after storage therein or before or after transmission to the WSARC 3000.

All of the electronic, mechanical, optical and display components of the IDC 2000 are housed within a camera body 2100. A viewfinder 2530 allows the operator to view a scene corresponding to, or identical to, an image formed on an image pickup 2510 of the IDC 2000 via the image-forming optical system 2500. The image-forming optical system 2500 can comprises an optical and/or digital zoom lens, or an auto-focus system, which can be controlled by the microprocessor 2200. That is, in accordance with an exemplary embodiment of the claimed invention, the microprocessor 2200 can increase the magnification of the optical/digital zoom lens of the image-forming optical system 2500 to enable the IDC 2000, such as a tablet or Smartphone, to be advantageously used as a binocular or microscope. Alternatively or in addition, the IDC 2000 comprises a removable optical or digital zoom lens attachment, thereby enabling the user to change the magnification capability of the IDC 2000 by changing to different lens attachment, e.g., wide-angled lens attachment, a telescopic zoom lens, etc.

The display 2300 displays the results of user interaction, status reporting to the user and images/vides captured or received by the IDC 2000. The storage device 2400 can be a memory, a hard drive, a DRAM, a NAND, a flash memory, a memory stick, a storage disk and the like. It is appreciated that IDC 2000 without the storage device 2400 has the benefit of lowering the cost of the IDC 2000. The storage device 2400 advantageously enables the user to continue recording even if the Internet connection is temporarily lost or unavailable.

Instead of the viewfinder 2530, the IDC 2000 in accordance with an embodiment of the present invention utilizes a detachable or integrated full video (LCD) display 2300. Accordingly, the display 2300 is a color or grayscale (video) LCD, and the microcontroller 2200 drives the display 2300 to show images formed on the image pickup 2510.

In accordance with an exemplary embodiment of the present invention, the storage device 2400 records the data constantly, preferably with a chosen time frame override. In accordance with an aspect of the present invention, the IDC 2000 transmits the data to the WSARC 3000 and simultaneously records the data on the storage device 2400.

In accordance with an exemplary embodiment of the present invention, the IDC 2000 comprises a meter that shows amount of time or data remaining to be transmitted to the WSARC 3000.

In accordance with an exemplary embodiment of the present invention, the storage device 1120 records the data when the Internet connection is lost. The IDC 2000 transmits the stored/archived data when the Internet connection to the WSARC 3000 is re-established. Preferably, the storage device 2400 records the data until all recorded data is sent to the WSARC 3000 over the Internet 4000 and then move seamlessly to transmitting live data without loss of data.

In accordance with an exemplary embodiment of the present invention, the storage device 1120 records the data where Internet access is unavailable, such as a factory or a remote site. Periodically, the IDC 2000 can be moved to a site where Internet access is available and the recordings can be transmitted to the WSARC 3000. In accordance with an embodiment of the present invention, the IDC 2000 can be replaced with another IDC 2000 so the recording is continuous. Preferably, the storage device 2400 is removable such that the storage device 2400 is periodically replaced with a new one so that the recording is continuous. The recordings on the removed IDC 2000 and/or the storage device 1120 are then transferred to the WSARC 3000.

In accordance with an exemplary embodiment of the present invention, the IDC 2000 comprises a light indicator, such as an LED 2310, indicating whether the IDC 2000 is connected to the Internet (i.e., the WSARC 3000). The LED 2310 is "green" to indicate that the IDC 2000 is connected to the WSARC 3000 and "red" to indicate that the IDC 2000 is not connected to the WSARC 3000. This will advantageously enable the user or operator of the IDC 2000 to know the status of the Internet connection immediately. In accordance with an aspect of the present invention, if the WSARC 3000 loses connection to an IDC 2000, the WSARC 3000 sends an email to a predetermined address or places a phone call to a predetermined number (or other comparable notification means) designated by the registered user of the IDC 2000.

In accordance with an exemplary embodiment of the present invention, the IDC 2000 comprises a motion sensor 2700 for activating the recording only when the motion sensor 2700 detects motion. For example, this can be useful for monitoring remote, unpopulated locations, such as a warehouse or a factory in off-hour or a summer or winter home in off-season, for any unauthorized intrusion. Preferably, the IDC 2000 only records when the motion sensor 2700 detects an activity or motion within a monitoring area or site. In accordance with an aspect of the present invention, upon activation of the IDC 2000, the WSARC 3000 can be setup or program to send an email to a predetermined address or place a phone call to a predetermined number (or other comparable notification means), which can be designated by the registered user of the IDC 2000.

In accordance with an exemplary embodiment of the present invention, the IDC 2000 can be placed or mounted on a mounting device 1100 which can rotate or pivot the IDC 2000, thereby enabling the operator to remotely control the IDC 2000 via the WSARC 3000. As noted herein, for example, when the registered user receives an email or a phone call that the IDC 2000 has detected an activity within a warehouse, the registered user can log onto the WSARC 3000 and remotely operate one or more IDCs 2000 within the warehouse to determine the cause of this activity. Alternatively, an operator associated with the WSARC 3000 can remotely operate one or more IDCs 2000 within the warehouse to determine the cause of this activity. Such remote monitoring capability with the IICS 1000 enables the operator of the WSARC 3000 or the registered user to quickly determine if the activity is a false alarm or real intrusion that needs to be dealt with and reported to the local police authority.

In accordance with an exemplary embodiment of the present invention, the WSARC 3000 is staffed with operators, technicians, security personnel and the like to provide a full monitoring service, such as 24/7 (24 hours/7 days a week) monitoring service. If the operator of the WSARC 3000 determines if there is an incident or event warranting a investigation within a remote monitoring site, such as a home, office, warehouse, etc., the operator can dispatch a security personnel to investigate the incident.

In accordance with an exemplary embodiment of the present invention, the IDC 2000 comprises a battery 2800, which provides power to all of the components of the IDC 2000. It is appreciated that IDC 2000 can be powered by any variety of power sources. The IDC 2000 can be powered exclusively by the internal battery 2800 or by other power sources, such as solar power or AC power with the internal battery 2800 serving as a backup power source. Preferably, the internal battery 2800 is a rechargeable battery that can be recharged by solar or electrical power. The rechargeable battery can incorporate an AC adapter, preferably provided outside the IDC 2000 in order to reduce the size of the camera. The AC adapter plugs into a conventional AC outlet, and can be a "Universal" AC adapter connectable to various worldwide AC supplies. In accordance with an embodiment of the present invention, the IDC 2000 can be setup or programmed to alert the WSARC 3000 to send an email to a predetermined address or place a call to predetermined number (or other comparable notification means) when the IDC 2000 determines the power of the battery 2800 is below a predetermined threshold. Additionally, the WSARC 3000 automatically sends an email to a predetermined address or place a call to a predetermined number (or other comparable notification means) when the WSARC 3000 is unavailable to communicate with WSARC 3000 for any reason, such as loss of power, loss of Internet connection, etc. This advantageously alerts the registered user of the IDC 2000 to replace the IDC's battery 2800.

In accordance with an exemplary embodiment of the present invention, the IDC 2000 can be used as a cell phone employing voice over IP (VOIP) via the Internet connection or traditional cellular network for voice communication and/or data transmission, such as text messages. Additionally, the IDC 2000 can use the Internet connection to download live or recorded audio and/or video content from the Internet. The necessary hardware and software components can reside within the IDC 2000 or in a separate device removable attachable to the IDC 2000.

In accordance with an exemplary embodiment of the present invention, the IICS 1000 is deployed in a warehouse with 10 IDCs 2000. The registered user or an operator of the WSARC 3000 can view all ten IDCs 2000 individually, together or in a group. It is appreciated that more IDCs 2000 can be added or distributed over multiple warehouses or buildings.

In accordance with an exemplary embodiment of the present invention, the image pickup 2510 of the IDC 2000 can be infrared or UV light sensor suitable for recording or generating infrared or UV images. Preferably, the IDC 2000 comprises a scope-shaped attachment that can provide specialized lighting and/or scope-shaped magnified zoom lens to provide specialized viewing. For example, this enables the IDC 2000 to record fine cracks and crevices in machinery and/or building. The infrared light capability advantageously permits the IICS 1000 to operate in low light to monitor building or warehouse at night.

In accordance with an exemplary embodiment of the present invention, the WSARC 3000 is accessible by registered users and users authorized by registered users using their login name and password. The registered user can give other users access or viewing rights to certain files, folders, etc. on a permanent or temporary basis. That is, the user's ability to view recordings or data stored/archived in the WSARC 3000 will be dictated by the rights assigned to the user. The grouping and granting of certain viewing rights can be preset by the registered user or owner of the account. In accordance with an exemplary embodiment of the present invention, the WSARC 3000 can provide temporary access based on certain preference or fee. For example, to help cover the cost of recording Little League baseball games, a registered user can establish an account so parents, grandparents and friends of the players can access and download the recordings of the games for a fee. The fee can be one-time fee (i.e., for the entire season), per game, per access, etc.

It is appreciated that WSARC 3000 comprises standard known tools to enable the registered user can organize their images. In accordance with an exemplary embodiment of the present invention, the registered user can organize the images by location, e.g., warehouse, home, country house, etc., using a file folder hierarchy structure. When a user clicks on one of the displayed location, the WSARC 3000 displays another menu listing the groups within that location. For example, when a user clicks the location labeled "warehouse," the WSARC 3000 can list the following groups: office, garage, interior warehouse, outside perimeter, parking lot, etc. When a user clicks the location labeled "home," the WSARC 3000 can list the following groups: $1^{st}$ floor, $2^{nd}$ floor, living room, dining room, kitchen, garage, bedroom 1, bedroom 2, basement, outside perimeter, etc.

In accordance with an exemplary embodiment of the present invention, the WSARC 3000 can archive the recordings by date (such as year), name, or by event titled by the registered user. That is, the registered user can name or rename the recordings. This advantageously enables the user to search the archive by date, name or event. The registered user can label the events such as weddings, birthdays, anniversaries, etc. When a user clicks on an event labeled "birthdays," the WSARC 3000 displays a list of all of titles named "birthday,' for example:

Rita Marie's 1$^{st}$ Birthday
Rita Marie's 16$^{th}$ Birthday
Frankie's 1$^{st}$ Birthday
Alex's 1$^{st}$ Birthday
Mommy's 30$^{th}$ Birthday
Grandma's 70$^{th}$ Birthday It is appreciated that these events is also searchable by date and name. These events would be available to search by date and by group name. Whichever method is easier for the user to find, this all depends on the detail of label a given user employs.

In accordance with an exemplary embodiment of the present invention, the text module 2230 enables the registered user to type over the images before the images are transmitted to the WSARC 3000. Preferably, the LCD display 2300 comprises a touch keypad for entering text and labeling the image before it is transmitted to the WSARC 3000.

In accordance with an exemplary embodiment of the present invention, the IDC 2000 comprises a plug-in, e.g., USB port, for a microphone or headphones, to enable to the user to record voice over the live or recorded images. Alternatively, the WSARC 3000 comprises tools to enable the registered user to edit the recorded images to record voice over the stored/archived images to clarify, comment or explain the recorded images.

In accordance with an exemplary embodiment of the present invention, the LED 2310 is a white and/or colored LED to operate as a white and/or colored strobe light.

In accordance with an exemplary embodiment of the claimed invention, the image-forming optical system 2500 and the LCD display 2300 can operate together to provide a live still, streaming or video image of the user of the IDC 2000, thereby, for example, enabling the user to use the IDC 2000 as a mirror. In addition or alternatively, the microprocessor 2200 is operable to control the LCD display 2300 to provide a magnified mirror. The user can use the touch keypad of the LCD display 2300 to change the magnification of the mirror.

In accordance with an exemplary embodiment of the embodiment of the present invention, each account at WSARC 3000 can be assigned to one or more registered users, thereby permitting each registered user of the account to seamlessly transmit and receive images from the other registered user. For example, the parents are vacationing in Europe, the grandparents live in Brazil, Rita Marie is skiing in New Zealand, Alex is playing football in Florida and Frankie is diving in Hawaii. The IICS 1000 of the present invention enables the parents to seamlessly receive images from and transmit images to their daughter in New Zealand, the grandparents in Brazil and their sons in Hawaii and Florida.

In accordance with an exemplary embodiment of the present invention, the IDC 2000 comprises a web browser linked to the Internet 4000. The registered user can use the IDC 2000 to retrieve or view stored/archived images in its account on the WSARC 3000, manage its WSARC account, send/receive emails via an email account established on the WSARC 3000 or surf the Internet.

In accordance with an exemplary embodiment of the present invention, the IDC 2000 comprises a global position system (GPS) 2900 to determine the current location of the IDC 2000 and to provide such GPS location information to other IDC 2000. Also, the IDC 2000 can transmits the GPS location information with the data (e.g., still, audio and/or video image) to the WSARC 3000 over the Internet 400. It is appreciated that the GPS 2900 is a standard equipment in certain IDC 2000, such as a Smartphone 2000.

In accordance with an exemplary embodiment of the claimed invention, the IDC 2000 communicates with a satellite to obtain a satellite image, preferably live satellite image, of its current GPS location as determined by the GPS 2900. The satellite image received by the IDC 2000 is displayed on the LCD display 2300. The user can input location (e.g., user's current or another location) and zooming instructions for the satellite to the microprocessor 2200 using the touch keypad of the LCD display 2300. The processor 2200 transmits signals comprising location or zooming instructions to the satellite or satellite controller for the satellite to zoom in a particular location or adjust magnification of the satellite image based the zooming instructions.

In accordance with an exemplary embodiment of the present invention, the registered user can access the WSARC 3000 using the IDC 2000 or a standard computer to retrieve, view stored/archived images, email stored/archived images or download stored/archived images onto a CD, DVD and the like.

The IDC 2000 of the present invention comprises all of the standard known components to capture digital images, make a connection to the Internet, and transmit images over the Internet. This advantageously enables the IDC 2000 to be used in many applications, such as in entertainment, advertising, education, security, traffic monitoring, weather monitoring, child care monitoring, surveillance, and general consumer applications.

Although the above description sets forth particular embodiments of the present invention, modifications of the invention will be readily apparent to those skilled in the art, and it is intended that the scope of the invention be determined solely by the appended claims.

The invention claimed is:

1. A method for transmitting at least one of audio, still images and video images by an Internet direct device associated with a user over a communications network, comprising the steps of: automatically connecting the Internet direct device to the communications network on power-up using one of a plurality of available modes of connection, which is designated as a primary mode of connection; receiving at least one of audio, still images and video images by the Internet direct device; transmitting at least one of the received audio, the received still images and the received video images to an account associated with the Internet direct device on a website upon capture by a processor of the Internet direct device; and automatically switching to another available mode of connection by the processor when the primary mode of connection to the communications network is unavailable.

2. The method of claim 1, wherein the step of automatically switching comprises the step of switching to one of the following available modes of connection: a land line, DSL, cable, satellite, wireless network, cellular, Wi-Fi, and Wi-Max.

3. The method of claim 1, further comprising the steps of locally storing at least one the received audio, the received still images and the received video images in a storage device of the Internet direct device by the microprocessor when the connection to the communications network is unavailable, and transmitting the stored audio, the stored still images and the stored video images to the website by the processor when the connection to the communications network is re-established.

4. The method of claim 1, further comprising the step of accessing the Internet using a web browser of the Internet direct device over the communications network.

5. The method of claim 1, further comprising the step of communicating with other Internet direct devices via voice over IP by the Internet direct device associated with the user.

6. The method of claim 1, further comprising the step of transmitting at least one of audio, still images and video images to and from other Internet direct devices by the microprocessor of the Internet direct device associated with the user over the communications network.

7. The method of claim 1, further comprising the step of downloading live or recorded audio or video images from a website using a web browser over said communications network.

8. A non-transitory storage medium comprising a program for transmitting at least one of audio, still images and video images over a communications network when executed by an Internet direct device associated with a user to cause the Internet direct device to: automatically connect to the communications network on power-up using one of a plurality of available modes of connection, which is designated as a primary mode of connection; receive at least one of audio, still images and video images by the Internet direct device; transmit at least one of the received audio, the received still images and the received video images to an account associated with the Internet direct device on a website upon capture by a microprocessor of the Internet direct device; and automatically switch to another available mode of connection by the microprocessor when the primary mode of connection to the communications network is unavailable.

9. The storage medium of claim 8, the program when executed causes the Internet direct device to receive still or video images and audio from said website over the communications network, the program when executed causes the Internet direct device to locally store the received still or video images in a storage device when the connection to said communications network is unavailable, and transmits the stored still or video images and audio to said website when the connection to said communications network is re-established.

10. The storage medium of claim 8, the program when executed causes the Internet direct device to automatically switch to one of the following available modes of connection: a land line, DSL, cable, satellite, wireless network, cellular, Wi-Fi, and Wi-Max.

11. The storage medium of claim 8, the program when executed causes the Internet direct device to transmit and receive at least one of audio, still images and video images to and from other Internet direct devices over said communications network.

12. The storage medium of claim 8, the program when executed causes the Internet direct device to access the Internet using a web browser over the communications network.

13. The method of claim 8, the program when executed causes the Internet direct device to communicate with other Internet direct devices via voice over IP.

14. The method of claim 8, the program when executed causes the Internet direct device to download live or recorded audio or video images from a website using a web browser over said communications network.

* * * * *